(12) United States Patent
Bedard et al.

(10) Patent No.: US 9,022,156 B2
(45) Date of Patent: May 5, 2015

(54) LIMITER STRAP ADJUSTMENT SYSTEM FOR A SNOWMOBILE SUSPENSION

(71) Applicant: Bombardier Recreational Products Inc., Valcourt (CA)

(72) Inventors: Yvon Bedard, Orford (CA); Nicolas Bedard, St-Hubert (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 13/873,686

(22) Filed: Apr. 30, 2013

(65) Prior Publication Data

US 2013/0285339 A1 Oct. 31, 2013

Related U.S. Application Data

(60) Provisional application No. 61/640,496, filed on Apr. 30, 2012.

(51) Int. Cl.
*B62M 27/00* (2006.01)
*B62D 55/108* (2006.01)
*B62D 55/07* (2006.01)

(52) U.S. Cl.
CPC ............ *B62D 55/1083* (2013.01); *B62D 55/07* (2013.01); *B62D 55/108* (2013.01)

(58) Field of Classification Search
CPC ........................ B62M 27/02; B62M 2027/026
USPC ................................................... 180/193, 190
See application file for complete search history.

(56) References Cited

U.S. PATENT DOCUMENTS

| | | | | |
|---|---|---|---|---|
| 5,881,834 A * | 3/1999 | Karpik | ............... | 180/193 |
| 6,478,098 B2 * | 11/2002 | Boivin et al. | ............... | 180/9.52 |
| 8,676,440 B2 * | 3/2014 | Watson | ............... | 701/36 |
| 2012/0166043 A1 * | 6/2012 | Watson | ............... | 701/37 |
| 2012/0222908 A1 * | 9/2012 | Mangum | ............... | 180/193 |

* cited by examiner

*Primary Examiner* — Joseph Rocca
*Assistant Examiner* — Marlon Arce
(74) *Attorney, Agent, or Firm* — BCF LLP

(57) ABSTRACT

A snowmobile rear suspension assembly has a pair of slide rails and at least one suspension arm pivotally connected thereto and adapted to be pivotally connected to a tunnel. A shock absorber is adapted to be pivotally connected between the tunnel and the slide rails. A limiter strap, adapted to extend between the tunnel and the slide rails, is substantially inextensible to limit separation therebetween. A strap holder, connected between an end of the limiter strap and the slide rails or the tunnel when the at least one suspension arm is connected to the tunnel, is moveable between a first and a second strap holder position. A position of the end of the limiter strap, relative to the slide rails or the tunnel, is different in the first strap holder position compared to the second strap holder position. A method of adjusting the limiter strap is also disclosed.

25 Claims, 11 Drawing Sheets

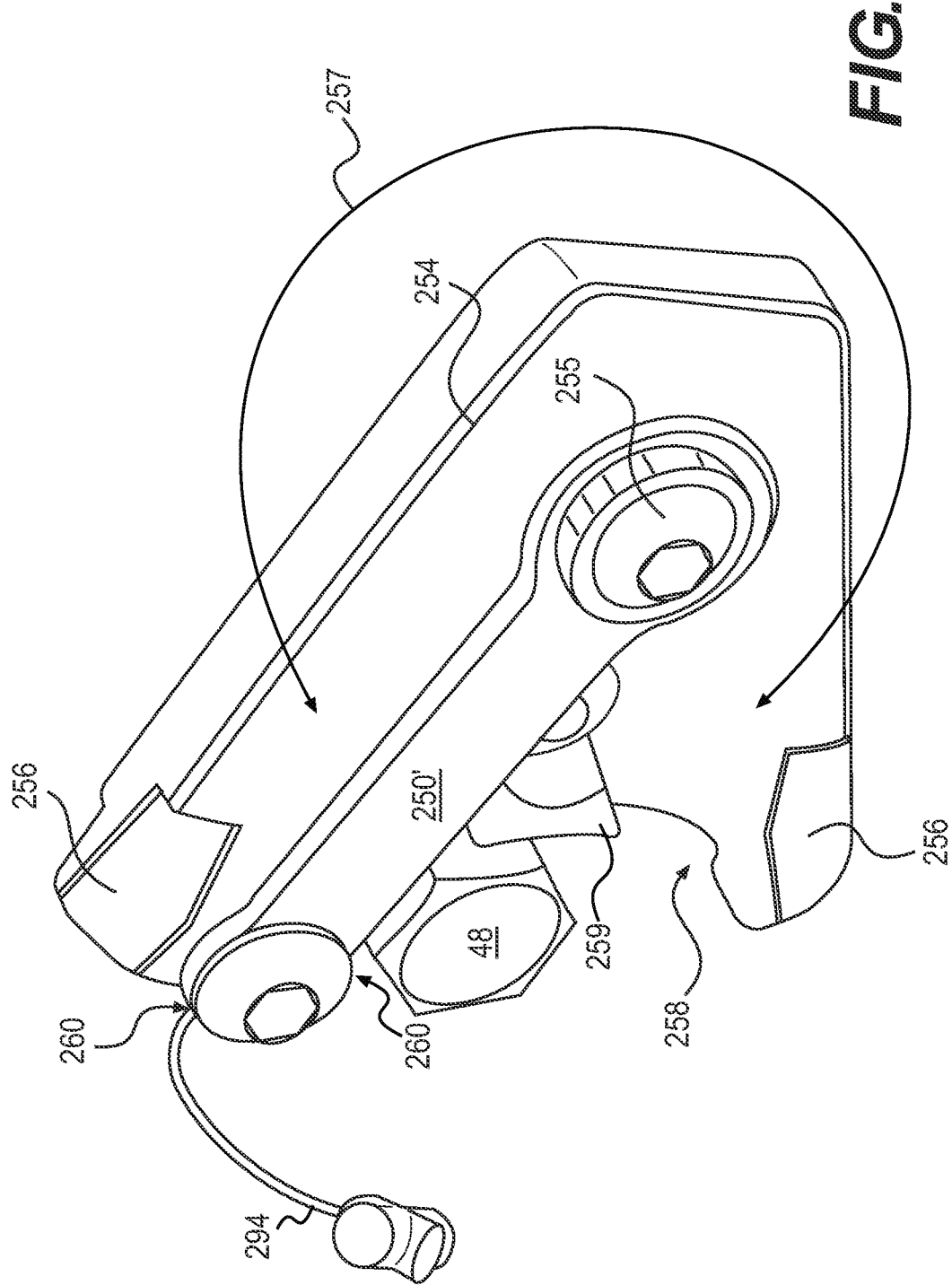

LIMITER STRAP ADJUSTMENT SYSTEM FOR A SNOWMOBILE SUSPENSION

CROSS-REFERENCE

The present application claims priority to U.S. Provisional Patent Application No. 61/640,496 filed on Apr. 30, 2012, the entirety of which is incorporated herein by reference.

FIELD OF THE INVENTION

The present invention relates generally to a limiter strap adjustment system for a snowmobile suspension.

BACKGROUND

Snowmobiles are designed for travel on a variety of surfaces and terrains, rough and smooth, soft and rigid, level, and inclined upwards or inclined downwards. While the snowmobile engine drives the snowmobile, its suspension system provides stability and control for proper operation of the snowmobile. The suspension system is additionally designed to provide cushioning from the unevenness of the surface being traveled upon, and thereby, to provide a comfortable riding experience. Snowmobiles and snowmobile suspension systems are generally adapted for different uses, such as for utility or for recreation. The configuration of a snowmobile and its suspension system can also be optimized for different riding conditions, such as terrain roughness, inclination and other trail conditions.

A versatile snowmobile should be usable by different riders in different riding conditions. It is therefore desirable to have a snowmobile, with adjustable configurations, so that the snowmobile can be optimized for different riding conditions, and to have this adjustment be simple, robust and reliable.

In some situations, such as for riding on inclined surfaces, it is important to adjust the weight distribution between the front and rear portions of the snowmobile, which is partly determined by the separation between the front portion of the chassis and the slide rails associated with the snowmobile track. This separation is typically limited by a limiter strap in the rear suspension of the snowmobile that is connected between the slide rails and the tunnel of the snowmobile chassis. Often, the limiter straps are in the form of a belt with a series of holes on either end, and the length of the belt is adjusted, for example, for riding on level surfaces or upwardly inclined slopes, by changing which holes are used to connect the belt. However, this adjustment is not an easy one for a rider to make, especially while out on a trail during a ride, as it requires accessing components on the underside of the chassis and tools for making the adjustment.

Therefore, there is a need for a limiter strap adjustment system for more easily adjusting a limiter strap of a rear suspension assembly of a snowmobile which is also robust enough to withstand normal riding conditions.

SUMMARY

It is an object of the present invention to ameliorate at least some of the inconveniences present in the prior art.

In one aspect, a rear suspension assembly for a snowmobile has a pair of slide rails and at least one suspension arm pivotally connected to the pair of slide rails and adapted to be pivotally connected to a tunnel of the snowmobile. A shock absorber is adapted to be pivotally connected between the tunnel and the pair of slide rails. A limiter strap is adapted to extend between the tunnel and the pair of slide rails. The limiter strap is substantially inextensible to limit separation between the pair of slide rails and the tunnel. A strap holder is connected between an end of the limiter strap and one of: the pair of slide rails and the tunnel when the at least one suspension arm is connected to the tunnel. The strap holder is moveable between a first strap holder position and a second strap holder position. A position of the end of the limiter strap, relative to the one of the pair of slide rails and the tunnel, is different in the first strap holder position compared to the second strap holder position.

In another aspect, the suspension assembly includes a biasing member connected to the strap holder for biasing the strap holder. The biasing member has at least a first biased position and a second biased position. The first and second biased positions are oppositely biased. In the first biased position, the biasing member biases the strap holder toward the first strap holder position, and in the second biased position, the biasing member biases the strap holder toward the second strap holder position.

In yet another aspect, the strap holder is prevented from moving between the first and second strap holder positions when the limiter strap is taut. The strap holder moves toward the second strap holder position if the biasing member is in the second biased position and the limiter strap is slack. The strap holder moves toward the first strap holder position if the biasing member is in the first biased position and the limiter strap is slack.

In another aspect, the biasing member is a torsion spring having a torsion axis and being rotatable about the torsion axis between at least the first biased position and the second biased position. A first end of the torsion spring is connected to the strap holder.

In an additional aspect, an adjustment lever is connected to a second end of the torsion spring for rotating the torsion spring between the first and second biased positions.

In a further aspect, the strap holder is connected between the end of the limiter strap and one of the at least one suspension arm.

In another aspect, the shock absorber is connected between the one of the at least one suspension arm and the pair of slide rails.

In an additional aspect, the strap holder includes a strap bar having two opposing ends and a central axis extending between the two opposing ends. A pair of plates attach the strap bar to the slide rails or the one of the at least one suspension arm. Each end of the strap bar is pivotally attached to one of the plates. The end of the limiter strap is attached to the strap bar between the two opposing ends of the strap bar. The first and second strap holder positions of the strap holder respectively correspond to first and second positions of the strap bar. The torsion spring is connected to the strap bar and adapted to pivot the strap bar about the torsion axis between the first and second positions. The central axis of the strap bar is parallel to the torsion axis.

In a further aspect, at least one of the plates includes strap bar stops, and the strap bar is limited to motion between the first and second position by the strap bar stops.

In another aspect, the one of the at least one suspension arm has an upper bar. The central axis of the strap holder is parallel to the upper bar. The separation between the central axis of the strap bar and the upper bar is different in the second position and in the first position.

In an additional aspect, a handle is connected to the adjustment lever to manually move the adjustment lever to rotate the first end of the torsion spring.

In another aspect, the handle is adapted to move between a first handle position and a second handle position. The first handle position corresponds to the first biased position of the torsion spring, and the second handle position corresponds to the second biased position of the torsion spring.

In yet another aspect, at least one directional stop is included. The handle is limited to move between the first and the second handle position by the at least one directional stop.

In another aspect, a handle base is included. The handle is movably attached to the handle base. The handle base is adapted to be fixed to an exterior surface of the snowmobile.

In a further aspect, the handle base has at least one projection to prevent motion of the handle out of the first and second handle positions.

In an additional aspect, the handle is a pivotable handle. The handle rotates between the two stops between the first handle position and the second handle position.

In another aspect, the handle base includes at least one directional stop to prevent rotation of the handle from the first handle position to the second position in one direction.

In a further aspect, an electromechanical motor is connected to the biasing member which is actuated by the electromechanical motor.

In another aspect, the one of the at least one suspension arm includes: an upper horizontal bar extending in the lateral direction and defining the upper portion of the one of the at least one suspension arm, a lower horizontal bar extending in the lateral direction and defining the lower portion of the one of the at least one suspension arm, a left side bar fixedly connecting left portions of the upper and lower horizontal bars, and a right side bar fixedly connecting right portions of the upper and lower horizontal bars. A vertical separation between the upper horizontal bar and the pair of slide rails is adapted to change with pivotal movement of the one of the at least one suspension arm.

In another aspect, a method of adjusting a limiter strap of a vehicle is provided. The vehicle has a limiter strap, a strap holder connected to an end of the limiter strap, and a biasing member connected to the strap holder. The method includes biasing the strap holder via the biasing member toward one of a first and a second strap holder position and preventing the strap holder from moving toward the one of the first and second strap holder positions if the limiter strap is taut. The method also includes propelling the vehicle along an uneven ground surface so as to change a tension within the limiter strap, and moving the strap holder to the one of the first and second strap holder positions via the biasing member when the tension in the limiter strap is slack.

In one aspect, a rear suspension assembly for a snowmobile has a pair of slide rails, having a front portion and a rear portion. A rear suspension arm is pivotally connected to the rear portion of the slide rails and adapted to be pivotally connected to the snowmobile. A front suspension arm has an upper portion and a lower portion. The upper portion is adapted to be pivotally connected to the snowmobile and the lower portion is pivotally connected to the front portion of the slide rails. A shock absorber connected to the slide rails. A limiter strap extends between the front suspension arm and the slide rails. The limiter strap is substantially inextensible to limit separation between the front portion of the slide rails and the upper portion of the front suspension arm. A strap holder is connected between an end of the limiter strap and one of the slide rails and the front suspension arm. The strap holder is moveable between a first strap holder position and a second strap holder position. A position of the end of the limiter strap, relative to the one of the slide rails and the front suspension arm, is different in the first strap holder position compared to the second strap holder position. A torsion spring has a torsion axis and is rotatable about the torsion axis between at least a first biased position and a second biased position. The first and second biased positions are oppositely biased. The torsion spring is attached to the strap holder and is adapted to selectively move the strap holder between the first strap holder position and the second strap holder position. An adjustment lever is connected to the torsion spring for rotating the torsion spring between the first and second biased positions. The first biased position is biased to move the strap holder to the first strap holder position, and the second biased position is biased to move the strap holder to the second strap holder position. The strap holder is adapted to be moved toward the second strap holder position if the torsion spring is in the second biased position and the limiter strap is slack. The strap holder is adapted to be moved toward the first strap holder position if the torsion spring is in the first biased position and the limiter strap is slack.

In some embodiments, a handle is provided for actuating the adjustment lever. In some embodiments, an electromotor is provided for actuating the adjustment lever. In some embodiments, the adjustment lever is actuated by a push-pull cable mechanism.

In an additional aspect, a snowmobile having the suspension assembly with the features as described above is also disclosed.

For purposes of the present application, terms related to spatial orientation when referring to the snowmobile and components in relation to the snowmobile, such as "forward", "rearward", "left", "right", "above" and "below", are as they would be understood by a driver of the snowmobile sitting thereon in a normal riding position, with the snowmobile in a straight ahead orientation (i.e. not steered left or right), and in an upright position (i.e. not tilted). When referring to a component alone, terms related to spatial orientation are described with respect to the component as disposed on the snowmobile. The explanations provided above regarding the above terms take precedence over explanations of these terms that may be found in any one of the documents incorporated herein by reference.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 11 is a close-up perspective view taken from a rear, left side of another embodiment of a handle and handle base for the limiter strap adjustment system of FIGS. 6A and 6B.

DETAILED DESCRIPTION

Figure 1:
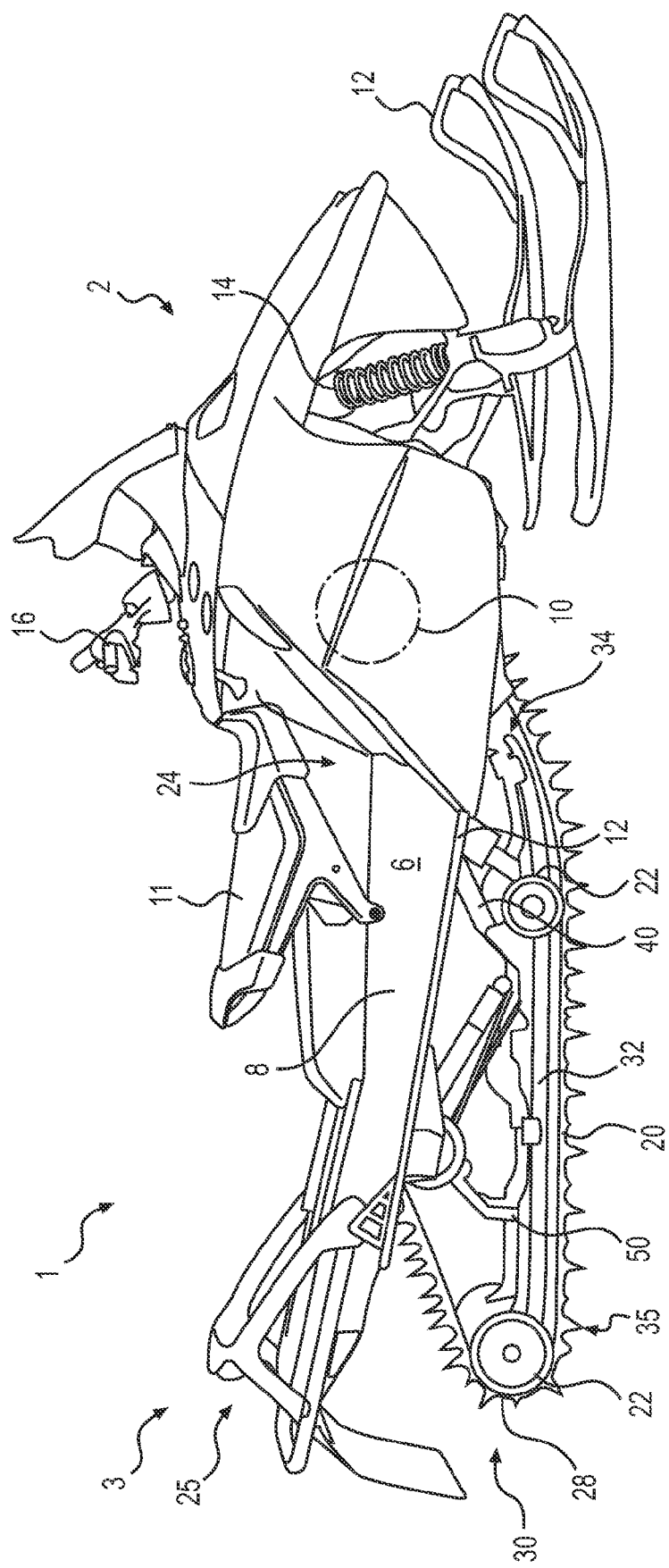
FIG. 1 is a perspective view taken from a top, right side of a snowmobile.

With reference to FIG. 1, a snowmobile 1 has a front portion 2 and a rear portion 3, consistently defined with the forward travel direction of the snowmobile 1. The snowmobile 1 has a chassis 6 including a tunnel 8 and an engine 10 (shown schematically). A straddle-seat 11, configured for one rider, is attached to the top of the tunnel 8. It is contemplated that a straddle-seat 11, configured for two or more riders, could be attached to the tunnel 8. A footboard 12 extends laterally outwards from either side of the bottom portion of the tunnel 8. The footboards 12 are provided to support the feet of a driver and/or passenger seated on the seat 11.

In the front portion 2 of the snowmobile 1, a pair of skis 12 is attached to the chassis 6 by a front suspension assembly 14. A steering assembly, including handlebars 16 disposed in front of the seat 11, is operatively connected to the skis 12 for turning the skis 12, and thereby steering the snowmobile 1.

An endless drive track 20, disposed under tunnel 8, is operatively connected to the engine 10 through a belt transmission system (not shown). The engine 10 propels the snowmobile 1 along the ground by driving the endless drive track 20. A rear suspension assembly 30 supports the endless drive track 20 and the tunnel 8. A pair of slide rails 32 forming part of the rear suspension assembly 30 engage the upper surface of the ground-engaging portion of the endless drive track 20. Idler wheels 22, connected to the slide rails 32, to other parts of rear suspension assembly 30, and/or the tunnel 8, engage inner surfaces of the endless track 20. The idler wheels 22 roll along the inner surfaces of the endless track 20, keeping the track tensioned and defining the path of travel for the endless track 20. The front 14 and rear 30 suspension assemblies are also provided with shock absorbers to absorb shocks experienced during travel on uneven surfaces.

With reference to FIGS. 2 to 5, the rear suspension assembly 30 will now be discussed. As mentioned above, the rear suspension assembly 30 includes a pair of slide rails 32. The slide rails 32, disposed on either side of the longitudinal centerline 4 (FIG. 5) of the snowmobile 1, are connected to pairs of rear idler wheels 22 engaging the endless track 20, at the front 34, rear 35, and middle 36 portions of the slide rails 32.

Figure 2:
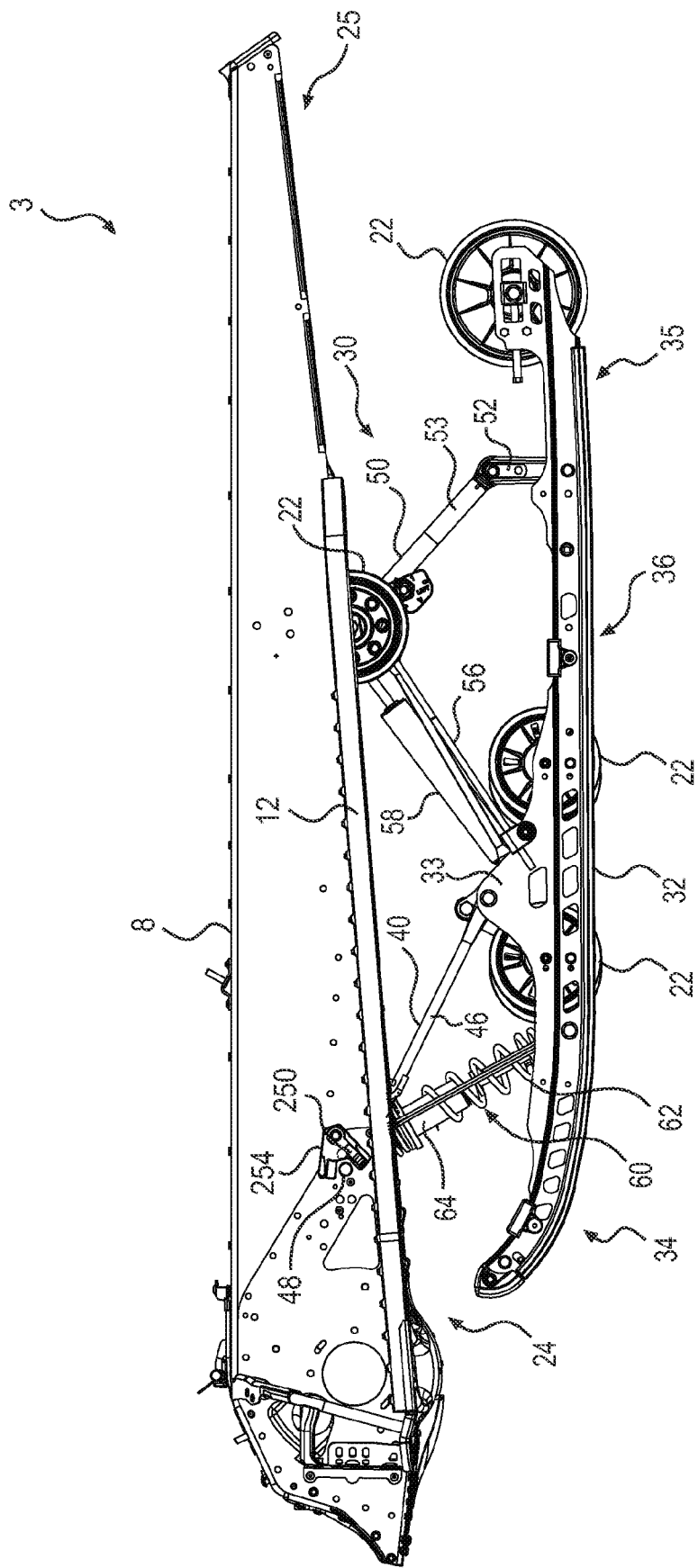
FIG. 2 is a left side elevation view of a portion of the snowmobile of FIG. 1, having a limiter strap adjustment system in a configuration for travel on a generally level surface with the limiter strap adjustment system in a first position.
Figure 3:
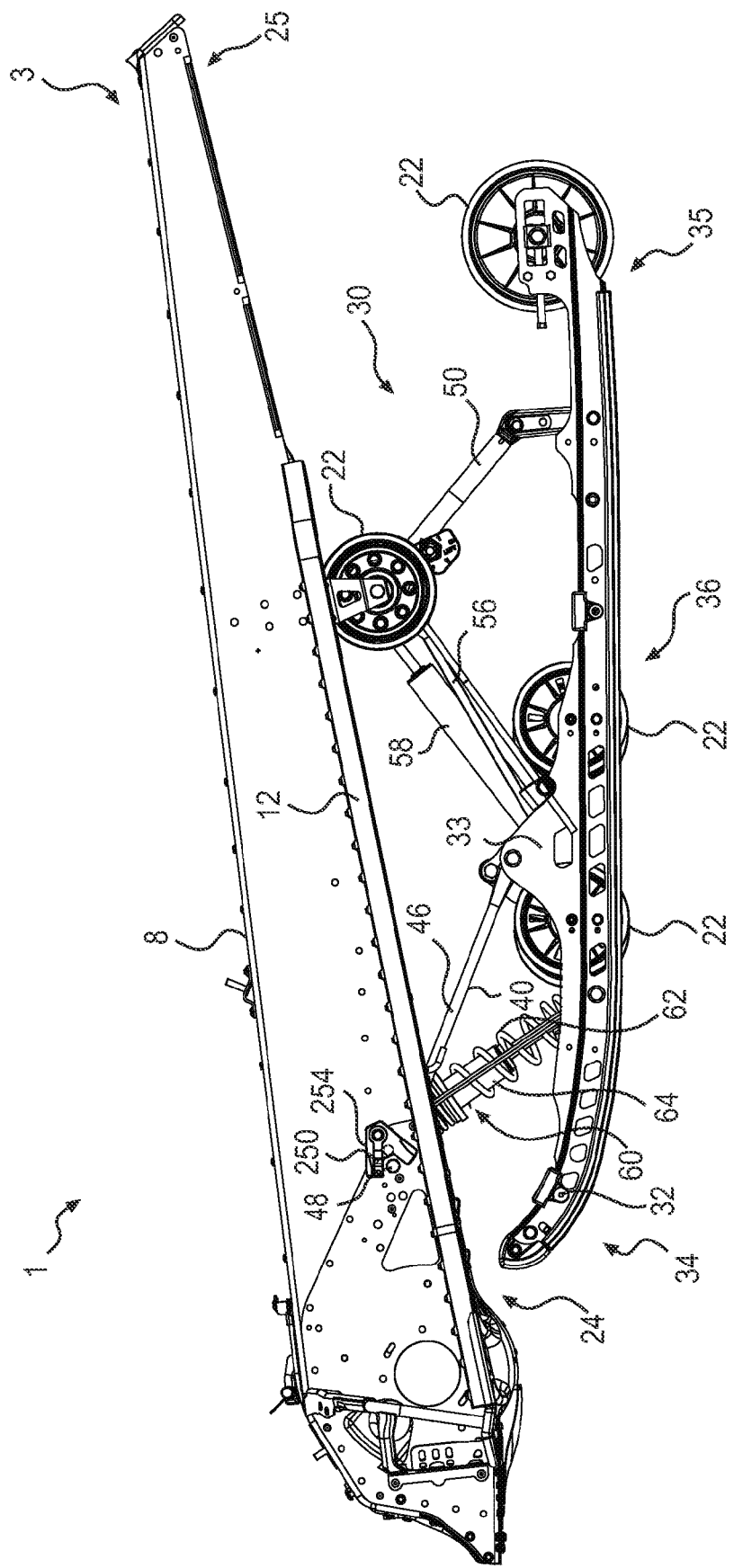
FIG. 3 is a left side elevation view of the portion of the snowmobile of FIG. 2 showing the limiter strap adjustment system in a configuration for travel on an upwardly inclined slope with the limiter strap adjustment system in a second position.

As best seen in FIGS. 2 and 3, the rear suspension assembly 30 includes a front suspension arm 40 and a rear suspension arm 50 disposed rearward of the front suspension arm 40. The front 40 and rear 50 suspension arms extend forwardly and upwardly from the slide rails 32. The tunnel 8 is supported by the front and rear suspension arms, 40 and 50. The pivoting of the suspension arms 40, 50 changes the relative angle and vertical separation between the slide rails 32 and the tunnel 8 to enable a transfer of weight to the front portion 2 or the rear portion 3 of the snowmobile 1 as appropriate for the travel speed and terrain, for example, during travel on inclined surfaces. The pivoting of the suspension arms 40, 50 also aids in bump absorption as the snowmobile travels over uneven or rough terrain.

Figure 4:
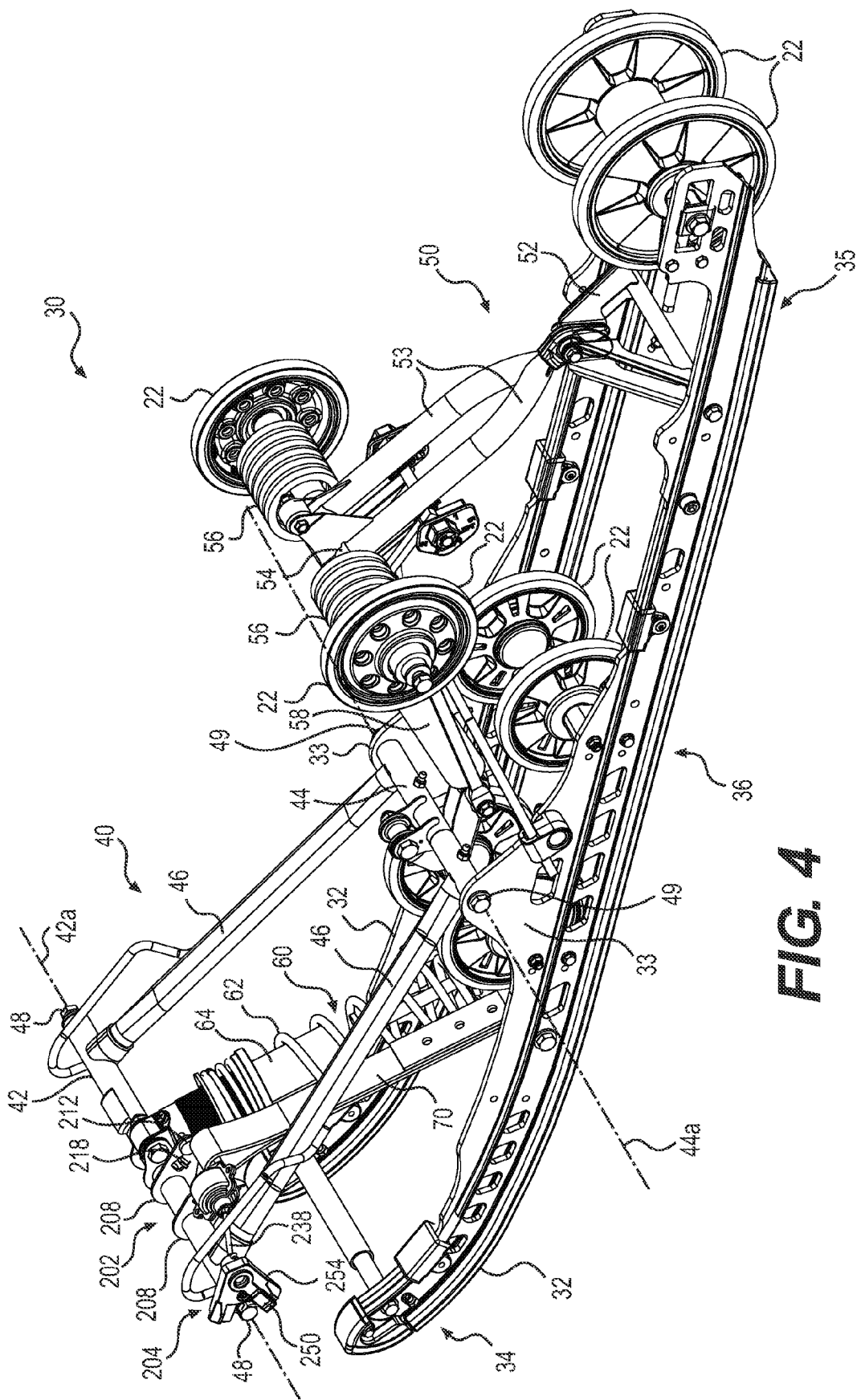
FIG. 4 is a perspective view taken from a rear, left side of the rear suspension assembly of the snowmobile of FIG. 2 with the limiter strap adjustment system disposed in the first position.
Figure 5:
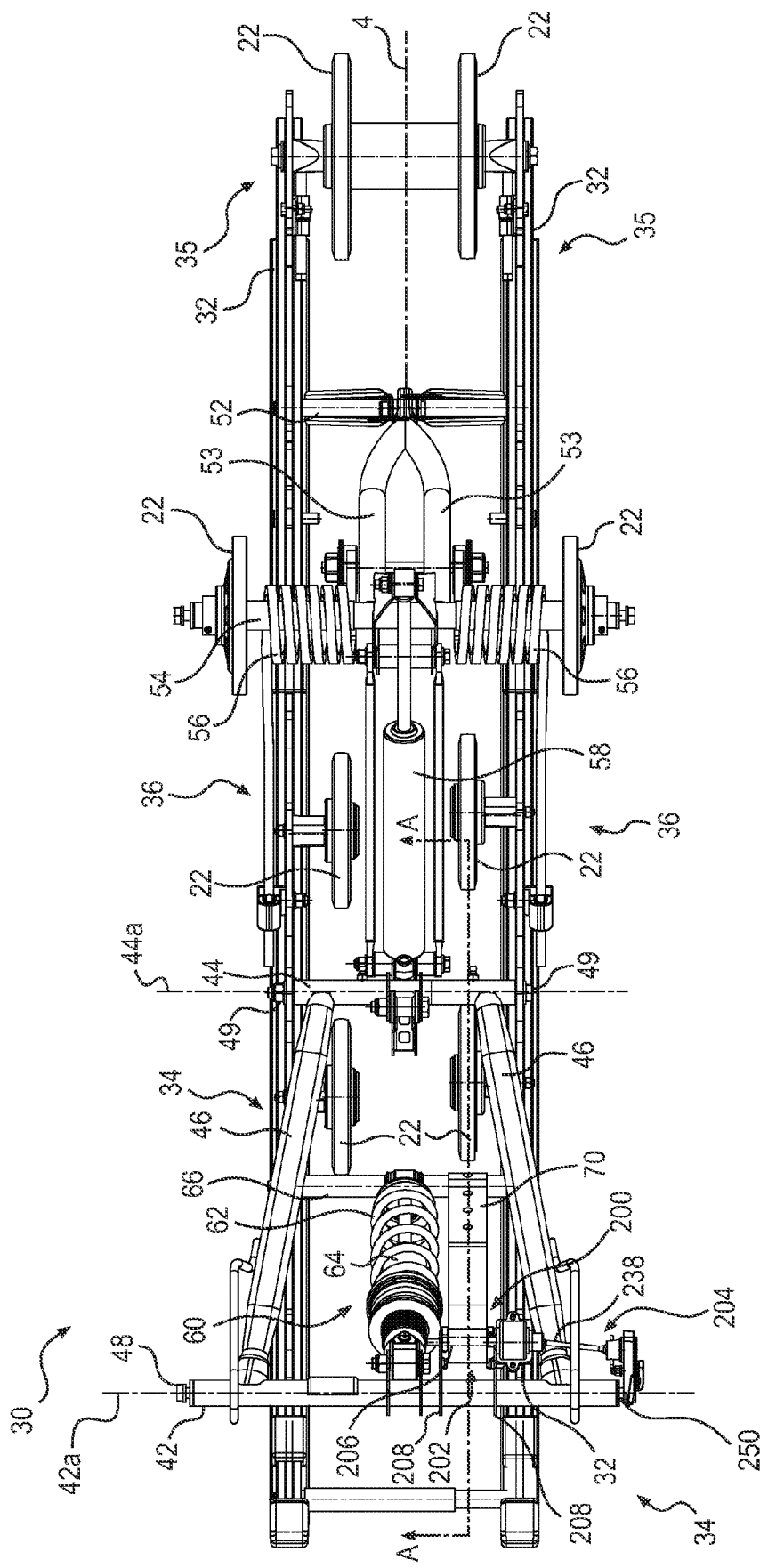
FIG. 5 is a top plan view of the rear suspension assembly of FIG. 4.

As best seen in FIGS. 4 and 5, the front suspension arm 40 comprises an upper bar 42 and a lower bar 44 extending horizontally, and two laterally spaced bars 46 extending between the upper bar 42 and lower bar 44 on either side of the longitudinal centerline 4. The lateral bars 46 are welded to the upper and lower bars, 42 and 44, to form a rigid front suspension arm 40. The upper bar 42 is a hollow metal tube rotatably attached to the tunnel 8 by means of a shaft (not shown) extending through the middle of the hollow tube 42 and bolted to the tunnel 8 by bolts 48. The lower bar 44, also a hollow metal tube, is rotatably attached to the slide rails 32 by means of a shaft (not shown) extending through the middle of the hollow tube 44 and bolted to upward extensions 33 of the slide rails 32 by bolts 49. The front suspension arm 40 thus pivots about the axis 42a of the upper bar 42 and the axis 44a of the lower bar 44. A front shock absorber 60, including a spring 62 and a hydraulic damper 64, extends between the upper bar 42 of the front suspension arm 40 and a cross-bar 66 (FIG. 5), extending between the slide rails 32.

A limiter strap 70 is connected to the upper bar 42 and the cross-bar 66, adjacent to the shock absorber 60 which is also connected between the bars 42 and 66. The limiter strap 70 is connected to the upper bar 42 via a strap holder 202. The lower end of the limiter strap 70 is connected to the slide rails 32 by the cross-bar 66, as can be seen in FIG. 5. The limiter strap 70 limits the separation between the front portion 25 of the tunnel 8 and the front portion 34 of the slide rail 32 to a maximum length, based on an effective length of the limiter strap 70, which is related to the length of the limiter strap 70 and the configuration of the strap holder 202, as discussed below. The limiter strap 70 is substantially inextensible. In the present embodiment, the limiter strap 70 is made of leather, although, it is contemplated that it could be made of any suitable material. It is also contemplated that the limiter strap 70 could be attached elsewhere along the tunnel 8 and the slide rails 32 to limit the separation between the front portion 25 of the tunnel 8 and the front portion 35 of the slide rail 32 to a maximum length.

The rear suspension arm 50 includes a lower portion 52, pivotally connected to the rear portion 35 of the slide rails 32, and an upper bar 54, pivotally connected to the tunnel 8 and to the lower portion 52 via a U-shaped bar 53. The laterally spaced arms of the U-shaped bar 53 are rigidly connected to the upper bar 54, and the bottom section of the U-shaped bar is rotatably connected to the lower portion 52. The upper bar 54 and the U-shaped bar 53 of the rear suspension arm 50, are made of hollow metal tubular structures, welded together. The lower portion 52 is in the shape of a triangle, extending between the slide rails 32 at the bottom and the U-shaped bar 53 at the top. Two torsion springs 56 are connected between the upper bar 54 of the rear suspension arm 50 and the slide rails 32. The helical sections of the torsion springs 56 are each mounted rotatably on the upper bar 54 of the rear suspension arm 50, on either side of the laterally spaced arms 53. An idler wheel 22 is rotatably mounted at each end of the upper bar 54 of the rear suspension arm 50 to engage the inner surface of the upper portion of the endless tracks 20. The tunnel 8 is pivotably connected to the ends of the upper bar 54. One end of the helical sections of the torsion springs 56, is connected to the bars 53 of the rear suspension arm 50, and the other end of each torsion spring 56 is connected to the upward extension 33 of the slide rails 32. A hydraulic damper 58 is connected between the upper bar 54 of the rear suspension arm 50 and the lower bar 44 of the front suspension arm 40. The torsion springs 56 and the hydraulic damper 58 function as a shock absorber for the rear suspension arm 50. It is contemplated that the rear suspension arm 50 could have a construction other than that described above. For example, the rear suspension arm 50 could be constructed such as the one shown in U.S. Pat. No. 6,631,778 issued on Oct. 14, 2003, the entirety of which is incorporated herein by reference.

In certain circumstances, for example, when going uphill or during acceleration, it is desirable to reduce the weight transfer from the front portion 2 of the snowmobile 1 to the rear portion 3 of the snowmobile so that the skis 12 maintain contact with the ground. When the front portion 24 of the tunnel 8 is permitted to lift away from the ground and the rear portion 25 of the tunnel 8 remains stationary or moves toward the ground, a greater fraction of the weight of the snowmobile 1 is transferred to the rear of the snowmobile 1 and thus the skis 12 are forced to lift off the ground. As mentioned above, the limiter strap 70 limits the separation between the front portions, 24 and 34, of the tunnel 8 and slide rails 32 by limiting the separation between the slide rails 32 and the upper bar 42 of the front suspension arm 40. The limiter strap 70 thus influences the relative distribution of weight onto the front 34 and rear portions 35 of the slide rail 32, and thus onto the skis 12 in the front of the snowmobile 1. FIG. 2 shows the configuration of the tunnel 8 and the slide rails 32 as they would be disposed on a level ground. FIG. 3 shows the configuration of the tunnel 8 and the slide rails 32 with the strap in a shorter effective length, thus distributing more of the weight of the snowmobile 1 towards the front portion of the snowmobile 1 and onto the skis 12. By changing its angle of attachment to the rear suspension assembly 30, the limiter strap 70 is configured to have a shorter effective length in the configuration of the rear suspension assembly 30 in FIG. 3 than in FIG. 2, as will be discussed below.

Figures 6A, 6B:
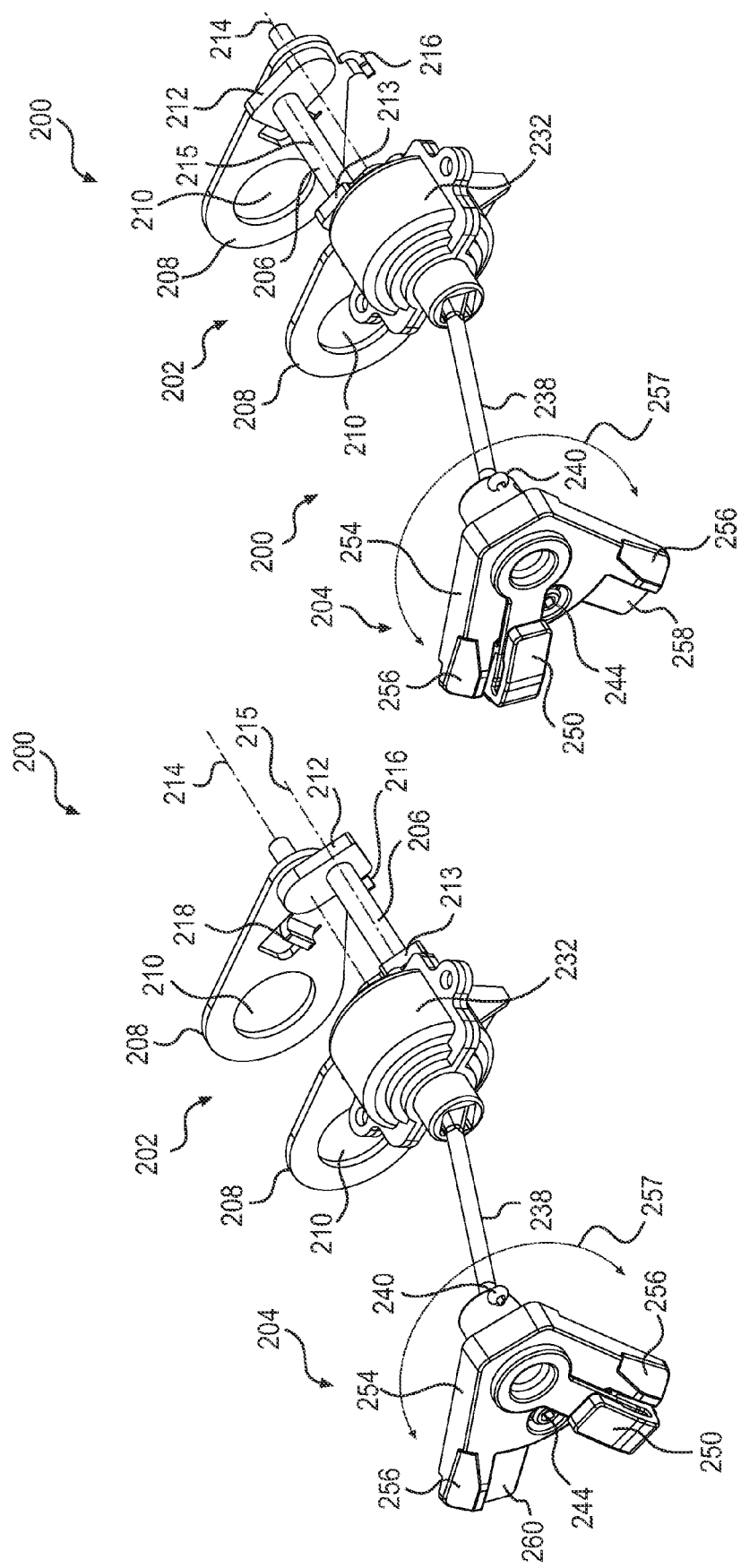
FIGS. 6A and 6B are close-up perspective views, taken from a rear left side, of the limiter strap adjustment system of the rear suspension assembly of FIG. 2, having a strap bar disposed in a first position in FIG. 6A and in a second position in FIG. 6B.
Figure 7:
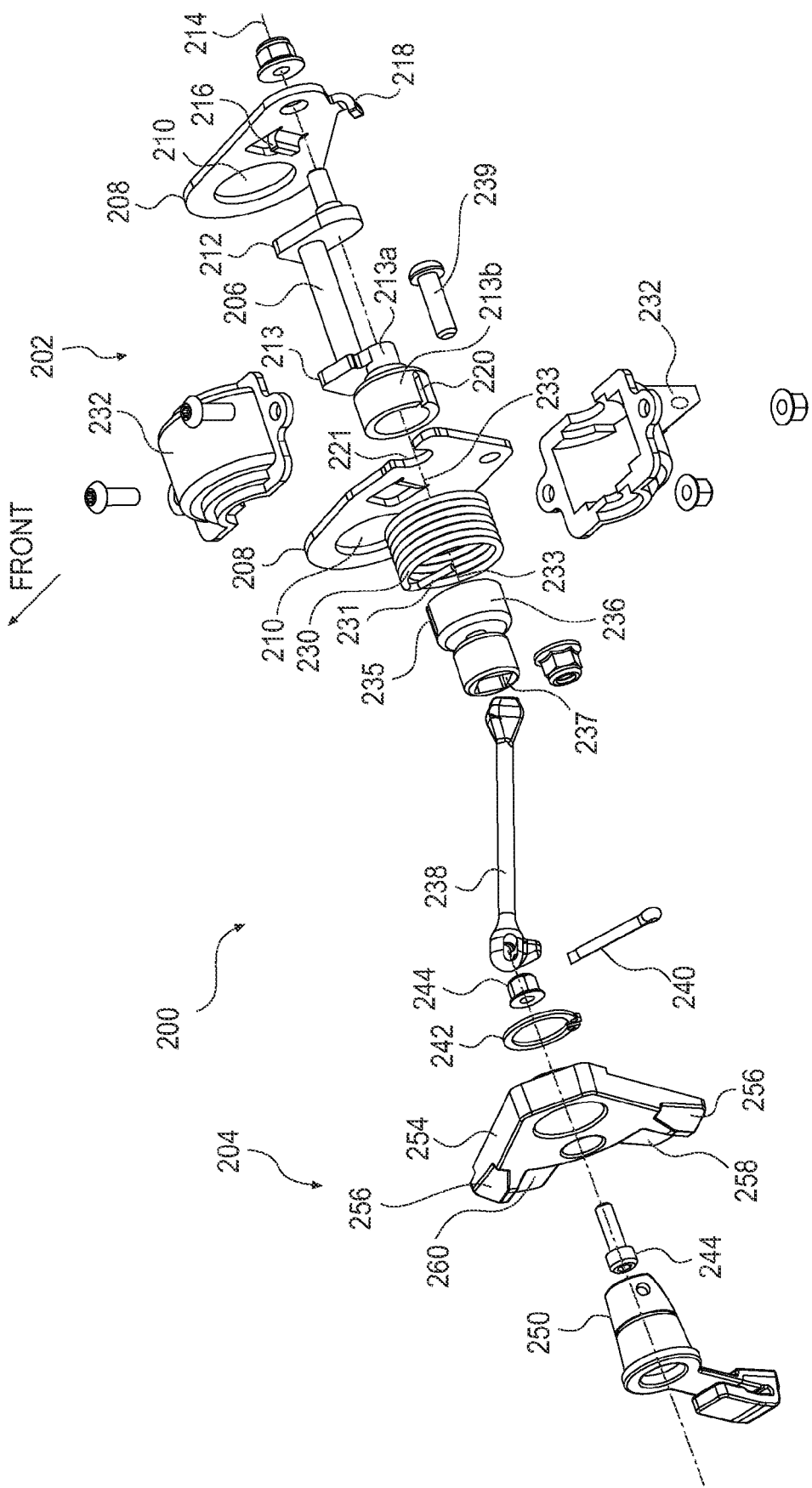
FIG. 7 is an exploded perspective view, taken from a rear, left side of the limiter strap adjustment system of FIGS. 6A and 6B.

Turning to FIGS. 6A, 6B and 7, a limiter strap adjustment system 200 will now be described. The limiter strap adjustment system 200 is provided to adjust the maximum separation between the slide rails 32 and the tunnel 8 which is set by the limiter strap 70. The limiter strap adjustment system 200 comprises a strap holder 202 for adjustably holding the limiter strap 70 and a strap adjuster 204 for adjusting the position of the strap 70.

The strap holder 202 comprises a strap bar 206 holding the upper looped end of the limiter strap 70, and a pair of plates 208, rigidly attached to the upper bar 42, to connect the limiter strap 70 to the upper bar 42. The plates 208 are disposed parallel to one another and welded to the upper bar 42 which is received through openings 210 in the plates 208. The strap bar 206 has a pair of flanges 212, 213 on opposite ends thereof which are rotatably connected to the plates 208, spaced from the upper bar openings 210 to rotate about an axis 214. The axis 214 is parallel to the upper bar 42. The axis 215 of the strap bar 206 is parallel to the rotation axis 214 of the flanges 212, 213 so that the strap bar 206 pivots about the axis 214 when the flanges 212, 213 rotate about the axis 214. A pair of stops, 216 and 218, projecting from the inner surfaces of each plate 208 towards the other plate 208, serves to block the motion of the flanges 212, 213 about the axis 214 beyond the stops, 216 and 218. When the strap bar 206 abuts the stop 216, it is in a first strap bar position, and when it abuts the stop 218, it is in a second strap bar position. For this configuration, with the limiter strap adjustment mechanism 200 attached to the upper bar 42 as described above, the effective length of the limiter strap 70 in the first position (abutting 216) is longer than the effective length in the second position (abutting 218), as will be discussed further below.

It is contemplated that the limiter strap adjustment mechanism 200 could be attached to other parts of the front suspension arm 40, tunnel 8 or to the slide rails 32. It is contemplated that the front suspension arm 40 could be configured differently than in the embodiment described above. It is also contemplated that the first and second positions of the strap bar 206 could be set at different positions, and that there could be more than two positions that the strap bar 206 could be set at. Other configurations are also contemplated for the strap holder 202. For example, the strap bar 206 could also be a hook, a clamp or some other means of holding the limiter strap 70.

The strap bar 206 is moved between the first position (abutting 216) and the second position (abutting 218) by a strap adjuster 204 as explained below. The strap adjuster 204 includes a biasing member, which in the illustrated embodiment is in the form of a torsion spring 230 (FIG. 7), for moving the strap bar 206. The torsion spring 230 is held in a housing 232 so as to be able to rotate about a torsion axis 233 which coincides with rotation axis 214 of the flanges 212, 213. The housing 232 includes two semi-cylindrical portions that are bolted together with the torsion spring 230 placed inside. The housing 232 is fixed to the left plate 208 via bolt 239. The left flange 213 of the strap bar 206 is coupled to the torsion spring 230. The left flange 213 has a shaft 213a connected between flange 213 and a cylindrical portion 213b. The shaft 213a is inserted into a semi-circular notch 221 of the left plate 208 such that the flange 213 and the cylindrical portion 213b are on opposite sides of the left plate 208. The cylindrical portion 213b has a notch 220. The right end (not seen in FIG. 7) of the torsion spring 230 is received in the notch 220. The strap bar 206 is thus coupled to the torsion spring 230. The left end 231a of the torsion spring 230 is received in a notch 235 of a cylindrical portion of a lever coupler 236. On the opposite end, the lever coupler 236 has a socket opening 237. The generally dog-bone shaped lever 238 is inserted into the socket opening 237, thus coupling the torsion spring 230 to the lever 238. The lever 238 is used to rotate the right end of the torsion spring 230 in order to bias it in one direction or another.

The lever 238 is connected to a handle 250, with a cotter pin 240, for moving the lever 238. The handle 250, which is a pivotable handle, is mounted on a handle base 254 secured to the outside of the tunnel 8, as shown in FIGS. 2 and 3, with a nut and bolt 244. The handle base 254 is mounted on the tunnel 8 adjacent to front suspension arm 40, with the bolt 244 adjacent the bolt 48 used to pivotably mount the front suspension arm 40 to the tunnel 8. The handle 250 is inserted through an opening in the handle base 254 and tunnel 8 (not shown) and secured with a circlip 242. Rotating the handle 250 along the path 257 rotates the lever 238, which rotates the torsion spring 230, thus biasing the torsion spring 230 for changing the position of the strap bar 206 and thereby the position of the limiter strap 70.

The handle base 254, shaped as a circular sector, is designed to hold the handle 250 in place in order to prevent the handle 250 from being accidentally and unintentionally knocked out of position causing the position of the strap bar 206 to change A first and second handle position, 258 and 260, are disposed on opposite sides of the handle base 254 with respect to the bolts 48 and 244. As can be seen in FIGS. 6A and 6B, raised projections 256 on the handle base 254, adjacent to handle position 258 and 260, on opposite sides of the bolt 244, prevent the handle 250 from unintentionally getting knocked out of position. In order to move the handle 250 from one position to another, the handle 250 in one of the positions 258, 260 is raised slightly from the surface of the handle base 254 and rotated over the projection 256 to the other position 258, 260 moving along the path 257. Having two distinct positions 258, 260 for the handle 250 provides a visual indication of the corresponding position of the strap bar 206.

With reference to FIG. 11, another embodiment of a pivotable handle 250' and handle base 254' will now be described. The handle base 254' has features similar to the ones of the handle base 254 of FIGS. 2 to 7. These features will be referred to using the same reference numerals as the ones of the handle base 254, and will not be described in greater detail herein again. The handle 250' is pivotably attached at one end to the base 254' by a bolt 255. The handle 250' is connected to the adjustment lever 238 for moving the strap bar 206. The handle 250' is pivotable about the bolt 255. A cable 294 is attached to the end of the handle 250' opposite the end pivotably connected to the base 254' by the bolt 255'. The base 254' has a projection 259 disposed between the two projections 256 such that the first and second positions 258, 260 of the handle 250' are disposed on either side of the central projection 259. The projection 259 prevents the handle 250' from being unintentionally jostled between the positions 258, 260 along the base 254'. When the handle 250' is placed in one of the positions, 258 or 260, the corresponding adjacent projection 256 and the projection 259 retain the handle 250' in that position 258 or 260. The cable 294 is used to move the handle 250' between the handle positions 258, 260 along the path 257 as described above. The handle 250' in one of the positions 258, 260 is raised slightly from the surface of the handle base 254' and rotated over the projection 256 to the other position 258, 260 along the path 257. When placed in one of the positions 258, 260, the height of the handle 250' above the surface of the base 254' is less than that of the projections 256 unlike the handle 250 which projects farther than the projections 256 from the surface of the base 254 as can be seen in FIG. 6A.

The first position 258 of the handle 250 corresponds to the first position of the strap bar 206 adjacent to the stop 216. When the handle 250 is in the first position 258, the torsion spring 230 is in a first biased position, biased to move the strap bar 206 to the first position adjacent to stop 216. When the handle 250 is in the second position 260, the torsion spring 230 is in a second biased position, biased to move the strap bar 206 to the second position adjacent to stop 218. If the strap bar 206 is already in a position, for example, the first position (abutting 216), that the torsion spring 230 is biased to move it to, then the strap bar 206 remains in that position (abutting 216) as long as the handle 250 remains in the handle position (258 in this example) corresponding to that strap bar position (abutting 216). When the handle 250 is moved from one position to the other (in this example, from 258 to 260), the strap bar 206 will move to the corresponding position (from abutting 216 to abutting 218), however, not necessarily immediately, depending on the tension of limiter strap 70. The limiter strap 70 looped around the strap bar 206, may keep the strap bar 206 in its current position (abutting 216, in this example) if the limiter strap 70 is under sufficient tension, despite the force exerted by the torsion spring 130 on the strap bar 206. Subsequently, when the snowmobile 1 encounters a bump the front portion of the slide rails 32 moves toward the tunnel 8, momentarily slackening the limiter strap 70 and allows the torsion spring 230 to move the strap bar 206 toward the new position (abutting 218, in this example). Thus, the strap bar 206 moves from one position to another position if the torsion spring 230 is biased to move it toward the other position, and when the limiter strap 70 is momentarily slackened, for example, when the snowmobile 1 encounters a bump. In the circumstance where the limiter strap 70 is sufficiently slackened at the moment when the handle 250 is moved to from a first position to a second position, the strap bar 206 moves to its corresponding second position immediately.

In the illustrated embodiment, the rotational (angular) displacement of the left end of the spring 230 caused by the movement of the handle 250 is greater than the corresponding rotational (angular) displacement of the strap bar 206. As a result of the relatively greater rotational displacement of the spring 230, when the strap bar 206 is in a position corresponding to the position of the handle 250, the spring 230 continues to bias the strap bar 206 against the corresponding stop 216 or 218. This prevents the strap bar 206 from rattling against the adjacent stop 216 or 218 which would create unwanted noise and vibration. It also ensures that the strap bar 206 is not jostled toward the other position during a momentary slackening and tightening of the limiter strap 70 caused by the movement of the snowmobile 1 over uneven terrain.

Figure 8:
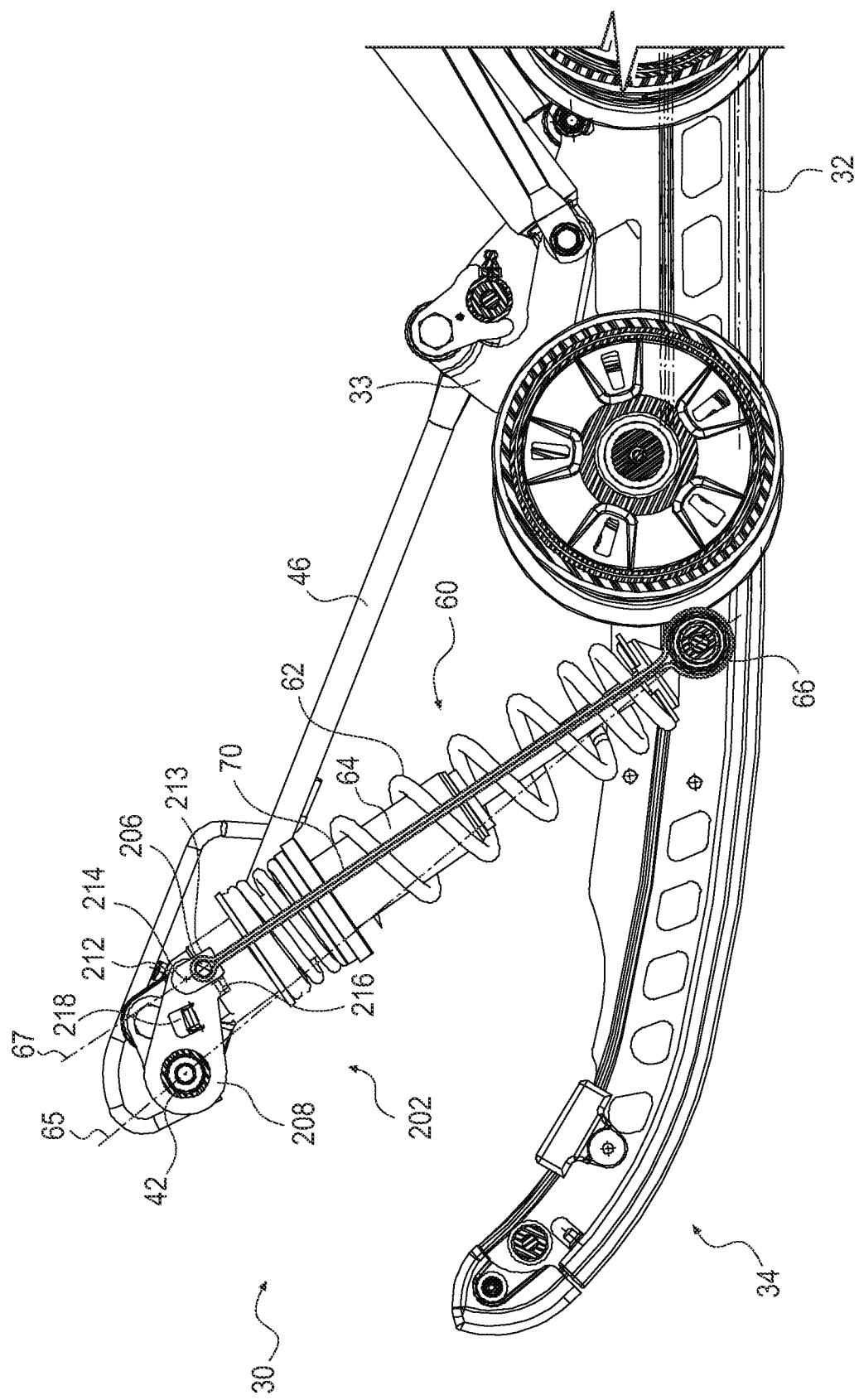
FIG. 8 is a longitudinal cross-sectional view of a portion of the rear suspension assembly of the snowmobile of FIG. 1, taken along line A-A of FIG. 5, showing the limiter strap adjustment system in the first position.
Figure 9:
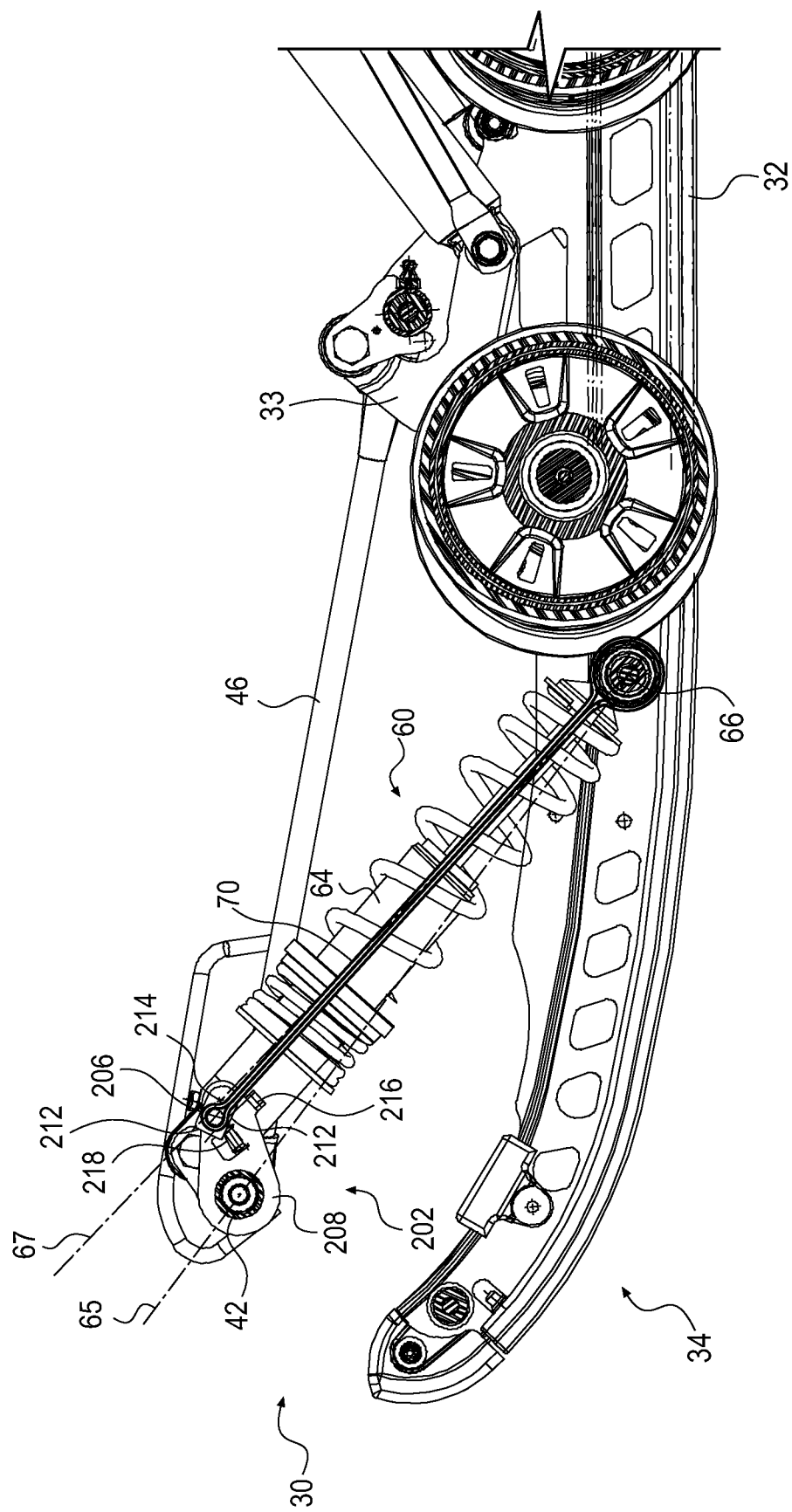
FIG. 9 is a longitudinal cross-sectional view of a portion of the rear suspension assembly of the snowmobile of FIG. 1, taken along line A-A of FIG. 5, showing the limiter strap adjustment system in the second position.

As can be seen in FIGS. 8 and 9, the strap adjuster 204 of the limiter strap adjustment system 200 selectively moves the strap bar 206, and thus the upper end of the limiter strap 70, between a position closer to the cross-bar 66 (FIG. 8) and a position farther from the cross-bar 66 (FIG. 9).

When in the second position (abutting 218, FIG. 9), the strap bar 206 has rotated from the first position (abutting 216, FIG. 8) beyond the plane 67 formed by the cross-bar 66 and the pivot axis 214. Thus, when the limiter strap 70 is taut, the strap bar 206 is retained in the second position (abutting 218) by the tension force exerted thereon by the limiter strap 70.

If the limiter strap 70 is directly connected to the upper bar 42 as in the prior art, the maximum separation allowed between the upper bar 42 and the cross-bar 66 is the length of the limiter strap 70. However, when the limiter strap 70 is connected to the upper bar 42 via the strap bar 206 and plates 208 of the strap holder 202, the maximum separation between the upper bar 42 and the cross-bar 66 is the effective length of the limiter strap 70, which depends on the actual length of the limiter strap 70 as well as the separation between the upper bar 42 and the strap bar 206, as discussed below.

If the limiter strap 70 is connected to the upper bar 42 by the strap bar 206, the effective length of the limiter strap 70, or the maximum separation allowed between the upper bar 42 and the cross-bar 66, depends on the projection of the length of the limiter strap 70 on the plane 65 formed by the upper bar 42 and the cross-bar 66, as well as the projection of the separation between the strap bar 206 and the upper bar 42, on the plane 65 formed by the upper bar 42 and the cross-bar 66. Thus, in the configuration of the limiter strap adjustment system 200 discussed here, and best seen in FIGS. 8 and 9, the effective length of the limiter strap 70 is longer when the strap bar 206 is in the first position (abutting 216, FIG. 8), than when it is in the second position (abutting 218, FIG. 9). Thus, the upper bar 42 can be pushed further away from the cross-bar 66 in the configuration of FIG. 8 than the configuration of FIG. 9.

In general, as the strap bar 206 is rotated around the axis 214, the effective length of the limiter strap 70 changes depending on the position of the strap bar 206 relative to the upper bar 42. In this configuration, in both the first and second positions (abutting 216 and abutting 218), the position of the strap bar projected onto the plane 65 formed by the upper bar 42 and cross-bar 66, is between the upper bar 42 and the cross-bar 66. Configurations of the strap holder 202 are also contemplated wherein, the projections of the first and second positions of the strap bar 206 in the plane 65 could be above or below the upper bar 42 relative to the cross-bar 66. It is also contemplated that the strap holder 202 could be configured to have more than two positions where the strap bar 206 can be retained.

It is contemplated that the strap holder 202 could be connected to the cross-bar 66, where the lower end of the limiter strap 70 is connected in the embodiment described here. It is also contemplated that the strap holder 202 could be connected to a different portion of the front suspension arm 40, or to a different part of the slide rails 32, for example, to a different cross-bar. It is also contemplated that the limiter strap 70 could be connected to the lower bar 44 and another part of the tunnel 8, or other parts in the front portion 25 of the tunnel 8 and a component connected to the front portion 35 of the slide rails 32 of the rear suspension assembly 30. While the limiter strap 70 and the shock absorber 60, are shown in this embodiment, attached between the same parts of the rear suspension assembly 30, it is contemplated that the limiter strap 70 and the shock absorber 60 could be attached between different parts of the rear suspension assembly 30.

Other systems for adjusting the position of the strap bar 206 and the limiter strap 70 are also contemplated.

Figure 10B:
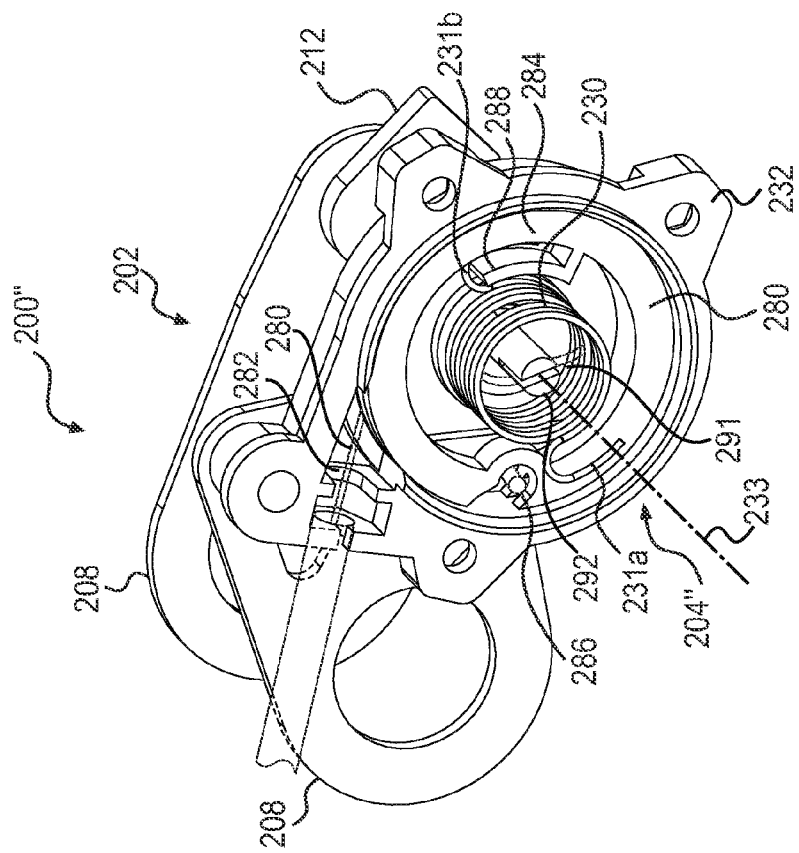
FIGS. 10A and 10B are perspective views, taken from a rear, left side, of additional embodiments of the limiter strap adjustment system.
Figure 10A:
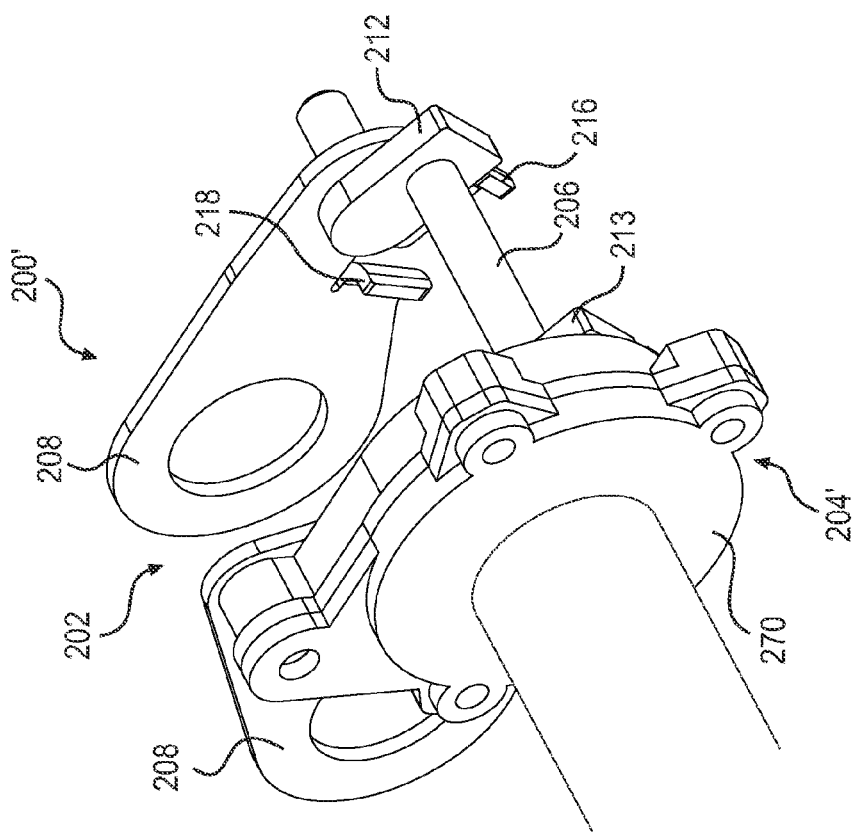

FIG. 10A shows a limiter strap adjustment system with an embodiment of strap adjuster 204' having an electric actuator 270 to actuate the strap bar 206. The electric actuator 270 is used to wind and unwind the spring 230 as described above using the handle 250.

In the embodiment of FIG. 10B, the strap adjuster 204" uses a push-pull cable 280 for moving the strap bar 206. The push-pull cable 280 is inserted through an opening 282 into the housing 232 and connected to a rotatable annular plate 284 of the housing 232 for rotating the plate 284. The push-pull cable 280 is extended around the plate 284, after being inserted through the opening 282. The end of the cable 280 is placed in a notch 286 of the plate 284 and connected to the plate 284 such that the plate 284 rotates clockwise when the cable 280 is pushed and counter-clockwise when the cable 280 is pulled when viewed from the left side as shown in FIG. 10B. The torsion spring 230 is placed inside the annular plate 284 concentrically therewith. A cylindrical post 292 extends inside the helical portion of the torsion spring 230 such that the torsion axis 233 coincides with the cylindrical axis of the post 292. The left end 231a of the torsion spring 230 is fixed to a cover (not shown) of the torsion spring housing 232. The right end 231b of the torsion spring 230 is fixed to an arcuate projection 288 of the rotatable plate 284 such that rotation of the plate 284 biases the torsion spring 230. The biased torsion spring 230 then moves the strap bar 206 as described above via the post 292. A segment 291 of the helical portion of the torsion spring 230 extends diametrically across the cylindrical space inside the helical portion passing through a slot of the post 292. The post 292 is rigidly connected to the left flange 213 of the strap bar 206 and rotatably supported by the torsion spring housing 232. The cylindrical axis of the post 292 coincides with the pivot axis 214 of the flange 213. The segment 291 of the torsion spring 230 engaging the post 292 serves to bias the strap bar 206 for moving the strap bar 206 between the first (abutting 216) and second (abutting 218) strap bar positions.

It is contemplated that a double pull-pull cable, one for pulling in a clockwise direction and another for pulling in a counter-clockwise position, could be used to rotate and bias the torsion spring 230 instead of the single push-pull cable 280.

The configuration of the front suspension arm 40 and the rear suspension arm 50 as discussed above is also not to be considered limiting. Other embodiments of the front and rear suspension arms, 40 and 50, having different configurations of arms and connections to the tunnel 8 and slide rails 32 are contemplated. For example, the upper and lower bars 42, 44 of the front suspension arm 40 could have a different shape, or a single lateral arm 46 could be included in the front suspension arm 40 instead of the two lateral arms 46. The particular connections of the torsion springs, extension and compression springs, and hydraulic dampers, and their connections to other parts of the rear suspension assembly 30, is also not to be considered limiting. Many configurations for suspending the tunnel 8 relative to the slide rails 32 are contemplated, as are several means for absorbing shocks from or preventing abrupt movements of the snowmobile 1. In any of these configurations, a limiter strap adjustment system 200, such as the one described herein can be utilized to adjust the effective length of a limiter strap 70 and thereby limit the vertical separation between the front portions 24, 34 of the tunnel 8 and slide rails 32 for the purpose of shifting more of the weight of the snowmobile 1 onto the front portion 2 of the snowmobile 1.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A rear suspension assembly for a snowmobile, comprising:
   a pair of slide rails;
   at least one suspension arm pivotally connected to the pair of slide rails and adapted to be pivotally connected to a tunnel of the snowmobile;
   a shock absorber being adapted to be pivotally connected between the tunnel and the pair of slide rails;
   a limiter strap adapted to extend between the tunnel and the pair of slide rails, the limiter strap being substantially inextensible to limit separation between the pair of slide rails and the tunnel;
   a strap holder connected between an end of the limiter strap and one of:
   the pair of slide rails, and
   the tunnel when the at least one suspension arm is connected to the tunnel,
   the strap holder being moveable between a first strap holder position and a second strap holder position, a position of the end of the limiter strap, relative to the one of the pair of slide rails and the tunnel, being different in the first strap holder position compared to the second strap holder position; and a torsion spring having a first end connected to the strap holder for biasing the strap holder, the torsion spring having a torsion axis and being rotatable about the torsion axis between at least a first biased position and a second biased position, the first and second biased positions being oppositely biased,
in the first biased position, the torsion spring biasing the strap holder toward the first strap holder position, and
in the second biased position, the torsion spring biasing the strap holder toward the second strap holder position.

2. The suspension assembly of claim 1 wherein:
the strap holder is prevented from moving between the first and second strap holder positions when the limiter strap is taut;
the strap holder moves toward the second strap holder position if the torsion spring is in the second biased position and the limiter strap is slack; and
the strap holder moves toward the first strap holder position if the torsion spring is in the first biased position and the limiter strap is slack.

3. The suspension assembly of claim 1, further comprising:
an adjustment lever connected to a second end of the torsion spring for rotating the torsion spring between the first and second biased positions.

4. The suspension assembly of claim 1, wherein the strap holder is connected between the end of the limiter strap and one of the at least one suspension arm.

5. The suspension assembly of claim 4, wherein the shock absorber is connected between the one of the at least one suspension arm and the pair of slide rails.

6. The suspension assembly of claim 1, wherein the strap holder comprises:
a strap bar having two opposing ends and a central axis extending between the two opposing ends; and
a pair of plates attaching the strap bar to the one of the slide rails and the one of the at least one suspension arm, each end of the strap bar being pivotally attached to one of the plates,
the end of the limiter strap being attached to the strap bar between the two opposing ends of the strap bar;
wherein:
the first and second strap holder positions of the strap holder respectively correspond to first and second positions of the strap bar;
the torsion spring is connected to the strap bar and is adapted to pivot the strap bar about the torsion axis between the first and second positions; and
the central axis of the strap bar is parallel to the torsion axis.

7. The suspension assembly of claim 6, wherein:
at least one of the plates comprises strap bar stops; and
the strap bar is limited to motion between the first and second position by the strap bar stops.

8. The suspension assembly of claim 6, wherein
the one of the at least one suspension arm comprises an upper bar;
the central axis of the strap holder is parallel to the upper bar; and
the separation between the central axis of the strap bar and the upper bar is different in the second position and in the first position.

9. The suspension assembly of claim 3, further comprising a handle connected to the adjustment lever to manually move the adjustment lever to rotate the first end of the torsion spring.

10. The suspension assembly of claim 6, wherein
the handle is adapted to move between a first handle position and a second handle position;
the first handle position corresponds to the first biased position of the torsion spring; and
the second handle position corresponds to the second biased position of the torsion spring.

11. The suspension assembly of claim 10, further comprising at least one directional stop wherein:
the handle is limited to move between the first and the second handle position by the at least one directional stop.

12. The suspension assembly of claim 9, further comprising a handle base, wherein:
the handle is movably attached to the handle base; and
the handle base is adapted to be fixed to an exterior surface of the snowmobile.

13. The suspension assembly of claim 12, wherein the handle base further comprises at least one projection to prevent motion of the handle out of the first and second handle positions.

14. The suspension assembly of claim 12, wherein
the handle is a pivotable handle; and
the handle rotates between the two stops between the first handle position and the second handle position.

15. The suspension assembly of claim 14, wherein the handle base comprises at least one directional stop to prevent rotation of the handle from the first handle position to the second position in one direction.

16. The suspension assembly of claim 1, further comprising an electric actuator connected to the torsion spring, wherein the torsion spring is actuated by the electric actuator.

17. The suspension assembly of claim 1, wherein the one of the at least one suspension arm comprises:
an upper horizontal bar extending in the lateral direction and defining the upper portion of the one of the at least one suspension arm;
a lower horizontal bar extending in the lateral direction and defining the lower portion of the one of the at least one suspension arm;
a left side bar fixedly connecting left portions of the upper and lower horizontal bars; and
a right side bar fixedly connecting right portions of the upper and lower horizontal bars;
wherein a vertical separation between the upper horizontal bar and the pair of slide rails is adapted to change with pivotal movement of the one of the at least one suspension arm.

18. A method of adjusting a limiter strap of a vehicle, the vehicle having:
a limiter strap;
a strap holder connected to an end of the limiter strap, the strap holder having at least a first strap holder position and a second strap holder position; and
a biasing member connected to the strap holder, the biasing member having at least a first biased position wherein the strap holder is biased towards the first strap holder position and a second biased position wherein the strap holder is biased towards the second strap holder position,
the method comprising:
biasing the strap holder toward one of the first strap holder position and the second strap holder position by moving the biasing member with respect to the strap holder to a corresponding one of the first biased position and the second biased position from an other of the first biased position and the second biased position without moving the strap holder to the one of the first strap holder position and the second strap holder position;

while biasing the strap holder toward the one of the first strap holder position and the second strap holder position, preventing the strap holder from moving toward the one of the first strap holder position and the second strap holder position if the limiter strap is taut;

propelling the vehicle along an uneven ground surface so as to change a tension within the limiter strap; and while propelling the vehicle along the uneven ground surface, moving the strap holder to the one of the first strap holder position and the second strap holder position when the tension in the limiter strap is slack.

19. The method of claim 18, wherein the vehicle includes a handle connected to the biasing member, the method further comprising:

moving the handle from a first position to a second position to cause the biasing member to apply a biasing force on the strap holder toward one of a first and a second strap holder positions, the biasing force increasing then remaining steady.

20. The method of claim 19 wherein:

the first position of the handle corresponds to the first position of the strap holder; and the second position of the handle corresponds to the second position of the strap holder; and moving the handle from a first position to a second position causes the biasing member to move the strap holder to the second strap holder position only upon slackening of tension in the limiter strap due to movement of the vehicle along the uneven ground surface.

21. A rear suspension assembly for a snowmobile, comprising:

a pair of slide rails;

at least one suspension arm pivotally connected to the pair of slide rails and adapted to be pivotally connected to a tunnel of the snowmobile;

a shock absorber being adapted to be pivotally connected between the tunnel and the pair of slide rails;

a limiter strap adapted to extend between the tunnel and the pair of slide rails, the limiter strap being substantially inextensible to limit separation between the pair of slide rails and the tunnel;

a strap holder connected between an end of the limiter strap and one of:
　the pair of slide rails; and
　the tunnel when the at least one suspension arm is connected to the tunnel, the strap holder being moveable between a first strap holder position and a second strap holder position, a position of the end of the limiter strap, relative to the one of the pair of slide rails and the tunnel, being different in the first strap holder position compared to the second strap holder position;

a biasing member connected to the strap holder for biasing the strap holder, the biasing member having at least a first biased position and a second biased position,
　in the first biased position, the biasing member biasing the strap holder toward the first strap holder position, and
　in the second biased position, the biasing member biasing the strap holder toward the second strap holder position; and a handle connected to the biasing member, the handle being moveable with respect to the strap holder to change the biasing force of the biasing member on the strap holder.

22. The suspension assembly of claim 21 wherein:
the biasing member is rotatable with respect to the strap holder.

23. A method of adjusting a limiter strap of a vehicle, the vehicle having:

a limiter strap;

a strap holder connected to an end of the limiter strap, the strap holder having a first strap holder position and a second strap holder position;

a biasing member connected to the strap holder; and a handle connected to the biasing member, the handle having a first position corresponding to the first strap holder position of the strap holder and a second position corresponding to the second strap holder position of the strap holder, the method comprising:

moving the handle from the first position to the second position and thereby increasing a force of the biasing member on the strap holder without moving the strap holder from the first strap holder position to the second strap holder position when the limiter strap is taut;

driving the vehicle over an uneven ground surface after moving the handle from the first position to the second position, and when a tension in the limiter strap is slackened due to the vehicle moving over the uneven ground surface, moving the strap holder, via the force of the biasing member, from the first strap holder position to the second strap holder position without further movement of the handle.

24. A rear suspension assembly for a snowmobile, comprising:

a pair of slide rails;

at least one suspension arm pivotally connected to the pair of slide rails and adapted to be pivotally connected to a tunnel of the snowmobile;

a shock absorber adapted to be pivotally connected between the tunnel and the pair of slide rails;

a limiter strap adapted to extend between the tunnel and the pair of slide rails, the limiter strap being substantially inextensible to limit separation between the pair of slide rails and the tunnel;

a strap holder connected between an end of the limiter strap and one of:
　the pair of slide rails, and
　the tunnel when the at least one suspension arm is connected to the tunnel, the strap holder being moveable between a first strap holder position and a second strap holder position, a position of the end of the limiter strap, relative to the one of the pair of slide rails and the tunnel, being different in the first strap holder position compared to the second strap holder position;

a handle operatively connected to the strap holder and being rotatable with respect to the strap holder, the handle having a first handle position corresponding to the first strap holder position of the strap holder and a second handle position corresponding to the second strap holder position of the strap holder; and a biasing member connected between the strap holder and the handle for biasing the strap holder,
　when the strap holder is in the second strap holder position and the handle is moved from the second handle position to the first handle position, the biasing member biasing the strap holder towards the first strap holder position, and when the strap holder is in the first strap holder position and the handle is moved from the first handle position to the second handle position, the biasing member biasing the strap holder toward the second strap holder position.

25. The suspension assembly of claim 24 wherein:

when the strap holder is in the first strap holder position and the handle is in the first handle position, the biasing member biases the strap holder to remain in the first strap holder position; and when the strap holder is in the second strap holder position and the handle is in the second handle position, the biasing member biases the strap holder to remain in the second strap holder position.

* * * * *

UNITED STATES PATENT AND TRADEMARK OFFICE
CERTIFICATE OF CORRECTION

| | | |
|---|---|---|
| PATENT NO. | : 9,022,156 B2 | Page 1 of 1 |
| APPLICATION NO. | : 13/873686 | |
| DATED | : May 5, 2015 | |
| INVENTOR(S) | : Yvon Bedard et al. | |

It is certified that error appears in the above-identified patent and that said Letters Patent is hereby corrected as shown below:

Claims

Claim 10, Column 14, line 1, "The suspension assembly of claim 6" should read -- The suspension assembly of claim 9 --

Signed and Sealed this
Fifteenth Day of September, 2015

Michelle K. Lee
*Director of the United States Patent and Trademark Office*